(12) United States Patent
Ayyappan et al.

(10) Patent No.: US 8,961,818 B2
(45) Date of Patent: Feb. 24, 2015

(54) DIESEL EXHAUST FLUID FORMULATION THAT REDUCES UREA DEPOSITS IN EXHAUST SYSTEMS

(71) Applicant: Deere & Company, Moline, IL (US)

(72) Inventors: Ponnaiyan Ayyappan, Cedar Falls, IA (US); Danan Dou, Cedar Falls, IA (US); Thomas Miller Harris, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/919,924

(22) Filed: Jun. 17, 2013

(65) Prior Publication Data
US 2014/0369910 A1   Dec. 18, 2014

(51) Int. Cl.
| | |
|---|---|
| B01D 53/92 | (2006.01) |
| B01D 53/94 | (2006.01) |
| C09K 3/00 | (2006.01) |
| F01N 3/08 | (2006.01) |
| F01N 3/10 | (2006.01) |
| F01N 3/20 | (2006.01) |

(52) U.S. Cl.
CPC .......... B01D 53/9431 (2013.01); F01N 3/2066 (2013.01)
USPC .............. 252/182.12; 252/182.34; 252/188.1; 423/212; 423/213.2; 60/295; 60/299

(58) Field of Classification Search
CPC .... B01D 53/56; B01D 53/78; B01D 53/9404; B01D 53/9418; C09K 3/00; F01N 3/206
USPC ............. 423/212, 213.2; 252/182.12, 182.34, 252/188.1; 60/295, 299
See application file for complete search history.

(56) References Cited

U.S. PATENT DOCUMENTS

| 5,171,554 A * | 12/1992 | Gardner-Chavis et al. ........................ 423/239.1 |
| 6,511,644 B1 | 1/2003 | MacArthur et al. |
| 8,133,460 B2 * | 3/2012 | Arvola et al. ................. 423/212 |
| 2013/0207035 A1 * | 8/2013 | Meessen .................... 252/188.1 |

FOREIGN PATENT DOCUMENTS

JP   2000279736 A   10/2000

* cited by examiner

Primary Examiner — Timothy Vanoy
(74) Attorney, Agent, or Firm — Faegre Baker Daniels LLP

(57) ABSTRACT

A Diesel Exhaust Fluid (DEF) that includes urea, demineralized water and between 5 and 300 ppm formaldehyde, this formulation of DEF include less than 0.6 ppm of phosphates, calcium, iron, aluminum, magnesium, sodium, and potassium, the formulation also includes less than 0.3 ppm copper, zinc, chromium, and nickel. This formulation of DEF reduces the accumulation of urea deposit in the diesel exhaust system relative to other formulation of specification grade DEF that include less formaldehyde.

20 Claims, 3 Drawing Sheets

DIESEL EXHAUST FLUID FORMULATION THAT REDUCES UREA DEPOSITS IN EXHAUST SYSTEMS

FIELD OF THE INVENTION

This invention relates generally to formulations of DEF that include low levels of formaldehyde and reduce the deposition of urea in the exhaust systems of engines that use DEF requiring SCR catalysts.

BACKGROUND

Diesel engines are the preferred means of producing torque for use in a wide range of applications ranging from uses in transportation such as heavy-duty trucks and trains, off-road agricultural and mining equipment to the large scale production of on-site electrical power to name a few. Their virtually unmatched power to mass ratios and the relative safety of their fuel makes them almost the only choice for use in applications such as long-haul trucks, tractors, earth movers, combines, surface mining equipment, non-electric locomotives, high capacity emergency power generators and the like.

Diesel engines operate at high internal temperature. One consequence of their high operating temperatures is that at least some of the Nitrogen present in the engine at the moment of combustion may combine with Oxygen to form $NO_x$ including species such as NO and $NO_2$. Another consequence of their high operating temperatures is that diesel exhaust at or near the point of exit from the engine is very hot.

A compound such as $NO_x$ is problematic because it readily combines with volatile organic compounds in the atmosphere to form smog. $NO_x$ is regarded as a pollutant and virtually every industrialized nation regulates the levels of $NO_x$ that can be legally discharged into the atmosphere. The regulation governing $NO_x$ emissions are expected to become even more strict. Fortunately, engine and equipment manufacturers have developed systems for reducing the levels of $NO_x$ produced by the combustion of diesel fuel and released into the environment. Still, with even tighter limits on the amounts of these compounds that can be released into the atmosphere there remains a need for improved materials and methods for reducing the levels of $NO_x$; some aspects of the instant invention address this need.

SUMMARY

Some embodiments provide formulations of Diesel Exhaust Fluid ("DEF") that includes about 32.5 wt. % urea at least 0.0010 wt. % formaldehyde, and demineralized water. The inventive formulations of DEF include less than 0.6 ppm of phosphates, calcium, iron, aluminium, magnesium, sodium, and potassium, the formulation also includes less than 0.3 ppm copper, zinc, chromium, and nickel.

In some embodiments, the DEF formulation includes about 0.005 wt. % formaldehyde. Still other embodiment include between about 0.0010 wt. % to about 0.3 wt. % formaldehyde.

In some embodiments, the formulation comprises between about 15.0 wt. % to about 40.0 wt. % urea; between about 15.0 wt. % to about 40.0 wt. % ammonium carbamate; at least 0.0010 wt. % formaldehyde, and between about 40.0 wt. % to about 60.0 wt. % water.

Some embodiments include formulations for reducing oxides of nitrogen, comprising: between about 19.0 wt. % to about 30.0 wt. % urea; between about 15.0 wt. % to about 40.0 wt. % ammonium carbamate; at least 0.0010 wt. % formaldehyde; and between about 40.0 wt. % to about 60.0 wt. % water. In some embodiments the formulations include: between about 19.0 wt. % to about 25.0 wt. % urea; between about 20.0 wt. % to about 35.0 wt. % ammonium carbamate; at least 0.0010 wt. % formaldehyde; and between about 45.0 wt. % to about wt. 55.0% water. And in still other embodiments the formulations include between about 19.0 wt. % to about 22.0 wt. % urea; between about 30.0 wt. % to about 35.0 wt. % ammonium carbamate; at least 0.0010 wt. % formaldehyde; and between about 45.0 wt. % to about 50.0 wt. % water.

Yet other embodiments include methods for reducing an oxide of nitrogen, comprising the steps of: providing a formulation, wherein the formulation includes: urea, ammonium carbamate and demineralized water and is suitable for use in Selective Catalytic Reduction ("SCR") of $NO_x$. In some embodiments, the formulation comprises between about 15.0 wt. % to about 40.0 wt. % urea; between about 15.0 wt. % to about 40.0 wt. % ammonium carbamate; at least 0.0010 wt. % formaldehyde, and between about 40.0 wt. % to about 60.0 wt. % water.

Yet other embodiments include adding ammonium carbamate as a readily soluble powder to a tank that already includes standard DEF. In some embodiments, these methods include the step of supplying pre-packaged quantities of powdered ammonium carbamate which can be added to a reductant tank that includes urea. In some embodiments, these methods include the step of determining the composition of the reductant to insure that the relative levels of water, urea and ammonium carbamate in the reductant system are suitable for use in SCR and the new mixtures exhibit lower freezing temperatures than conventional DEF.

In some embodiments, the methods for reducing oxides of nitrogen include the steps of supplying at least one SCR catalyst and contacting the SCR catalyst with said formulation. Some embodiments include the step of measuring the composition of said formulation. While still other embodiments include the further step of adding a portion of ammonium carbamate to a formulation of reductants.

Some embodiments provide DEF formulations suitable for use in methods and/or systems that reduce $NO_x$ exhaust emissions that include between about 15.0 wt. % to about 40.0 wt. % urea; between about 15.0 wt. % to about 40.0 wt. % ammonium carbamate; between about 0.0010 wt. % to about 0.3 wt. % formaldehyde; and between about 40.0 wt. % to about 60.0 wt. % water.

Yet other embodiments include systems for reducing an oxide of nitrogen in an engine exhaust, comprising the steps of: a formulation that includes a reductant wherein the formulation includes: between about 19.0 wt. % to about 30.0 wt. % urea; between about 15.0 wt. % to about 40.0 wt. % ammonium carbamate; between about 0.0010 wt. % to about 0.01 wt. % formaldehyde; and between about 40.0 wt. % to about 60.0 wt. % water; a SCR catalysts, where the catalyst catalyses the reduction of $NO_x$ by said reductant to form products that include $N_2$.

In some embodiments, the systems for reducing $NO_x$ emissions include: reductant formulations having between about 19.0 wt. % to about 25.0 wt. % urea; between about 20.0 wt. % to about 35.0 wt. % ammonium carbamate; between about 0.0010 wt. % to about 0.010 wt. % formaldehyde; and between about 45.0 wt. % to about wt. 55.0% water. In some embodiments, the formulations in the systems includes: between about 19.0 wt. % to about 22.0 wt. % urea; between about 30.0 wt. % to about 35.0 wt. % ammonium carbamate;

between about 0.0010 wt. % to about 0.3 wt. % formaldehyde; and between about 45.0 wt. % to about 50.0 wt. % water.

Some embodiments include methods for making spec grade Diesel Exhaust Fluid that has a final level of formaldehyde in the range of 0.001 wt. % to about 0.01 wt. %, or 0.002 wt. % to about 0.01 wt. %, or 0.005 wt. % to about 0.01 wt. %, or 0.001 wt. % to about 0.05 wt. %, or 0.0023 wt. % to about 0.01 wt. %, or 0.0023 wt. % to about 0.006 wt. %, or 0.001 wt. % to about 0.005 wt. %, or 0.001 wt. % to about 0.004 wt. %, or 0.001 wt. % to about 0.006 wt. %, these methods include adding a source of formaldehyde such as formalin to Diesel Exhaust Formulation such that the amount of formaldehyde added to the DEF is between about 0.06 wt % to about 1.0 wt. %, or 0.06 wt % to about 0.80 wt. %, or 0.06 wt % to about 0.60 wt. %, or 0.06 wt % to about 0.50 wt. %, or about 0.06 wt % to about 0.4 wt. %, or 0.1 wt % to about 1.0 wt. %, or 0.1 wt % to about 0.8 wt. %, or 0.1 wt % to about 0.6 wt. %, or 0.1 wt % to about 0.5 wt. %, or 0.1 wt % to about 0.4 wt. %, or about 0.10 wt. % to about 0.30 wt. % of the final formulation of DEF.

Some embodiments include methods and/or systems for adding formaldehyde to urea based diesel exhaust formulation. Methods for adding formaldehyde include bubbling or sparging gaseous formaldehyde in an aqueous preparation of exhaust treatment grade urea. Other methods including adding liquid preparations of that include formaldehyde such as formalin to aqueous solution of exhaust treatment grade urea. These additions can be made in bulk supplies before the diesel exhaust formulation is dispersed to individual pieces of equipment. In still other embodiments, individual pieces of equipment can be outfitted with a formaldehyde reservoir that is connected so as to deliver formaldehyde directly into the equipment's onboard DEF storage tank or to be co-administered along with DEF directly into the diesel exhaust system.

DESCRIPTION

Figure 1:
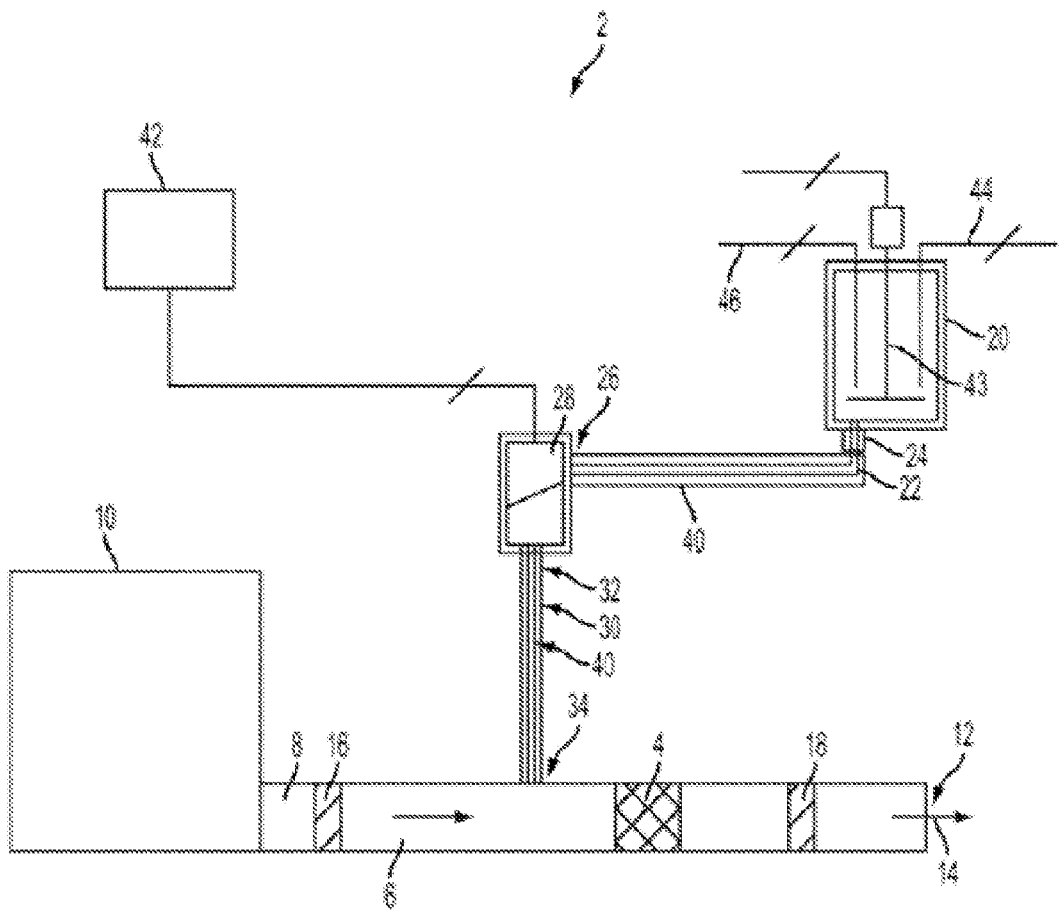
FIG. 1. Schematic diagram of a representative SCR exhaust treatment system for a diesel engine.

For the purposes of promoting an understanding of the principles of the novel technology, reference will now be made to the preferred embodiments thereof, and specific language will be used to describe the same. It will nevertheless be understood that no limitation of the scope of the novel technology is thereby intended, such alterations, modifications, and further applications of the principles of the novel technology being contemplated as would normally occur to one skilled in the art to which the novel technology relates are within the scope of this disclosure and what it claims.

Unless implicitly intended or explicitly stated otherwise, the term, "about" as used herein refers to a range of values including plus or minus 10 percent of the stated value, for example, about 1.0 encompasses the range of values 0.9 to 1.1.

As used herein the term "demineralized water" refers to water that includes very low levels of minerals in general, and in particular very low levels of sulfur, alkaline metals, earth metals, vanadium, arsenic, ash, or any other compounds that are known to damage SCR catalysts. Demineralized water for use in the inventive formulations can be made by any method known in the art for reducing the level of contaminants in demineralized water including distillation and reverse osmosis.

Most industrialized nations set limits on the levels of $NO_x$ that can be released into the atmosphere by diesel engines. In the United States, the Environmental Protection Agency (EPA) is the agency of the federal government responsible for regulating diesel engine exhaust emissions. The EPA has proffered new regulations governing the levels of $NO_x$ that can be legally discharged into the atmosphere by diesel engines powering off-road equipment. These new regulations are referred to as "Final Tier 4." The EPA's Final Tier 4 standards require that diesel engines which are operated off-road limit their $NO_x$ emissions to no more than 0.4 g/kW-h.

Currently available technology used to reduce the amount of $NO_x$ emission emitted from diesel exhaust fumes includes Selective Catalytic Reduction (SCR). This technology is widely used to reduce $NO_x$ emissions from heavy duty diesel engines and takes advantage of the high temperatures found in diesel exhaust fumes. Typical chemical reactions catalyzed by SCR catalysts are the reduction of $NO_x$ such as $NO_2$ or NO to $N_2$ and $H_2O$. In SCR based exhaust treatment systems, the oxidized forms of Nitrogen are reacted with compounds such as ammonia ($NH_3$). Some of the reactions that occur on the surface of the SCR catalyst include the following:

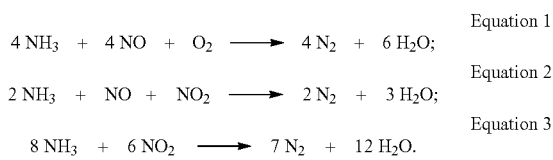

$$4\,NH_3 + 4\,NO + O_2 \longrightarrow 4\,N_2 + 6\,H_2O; \quad \text{Equation 1}$$

$$2\,NH_3 + NO + NO_2 \longrightarrow 2\,N_2 + 3\,H_2O; \quad \text{Equation 2}$$

$$8\,NH_3 + 6\,NO_2 \longrightarrow 7\,N_2 + 12\,H_2O. \quad \text{Equation 3}$$

Diesel Exhaust Fluid (DEF) is a formulation comprising about 32.5 wt. % urea in demineralized water. DEF is widely used to reduce NO and $NO_2$ to $N_2$ in a reaction that takes place on the surface of the SCR catalyst.

A typical SCR catalyst comprises a large surface area and includes an inert heat substrate that is coated with at least one stable catalytic material. Substrates used in such catalysts include ceramic materials; typical catalytic materials include metals and/or metal oxides such as copper, iron, vanadium, and the like. The particular combination of catalytic surface material and substrate for use in a particular application depends in part on a number of factors such as the composition fuel being combusted including, for example, the amount of sulphur in the fuel, the temperature of the exhaust gases, the levels of $NO_x$ reduction desired, the reductant being used, the levels and types of other compounds present in the exhaust fumes and the like.

Anhydrous ammonia exists predominately as a gas under ambient conditions while aqueous ammonia is formed by contacting ammonia with water. Anhydrous ammonia is difficult to handle and dangerous if not properly contained. Ammonia carrier such as urea is safer and easier to handle, store and transport than anhydrous ammonia. Urea plus water exists in liquid form at standard temperature and pressure. DEF is an especially useful reductant for use in mobile applications since it is easier to handle, store and transport than anhydrous ammonia. Accordingly, DEF is a commonly used reductant in SCR diesel exhaust treatment systems used in mobile applications such as heavy trucks and off-road construction and agricultural equipment.

In a typical SCR based exhaust treatment system, an SCR catalyst is positioned in the exhaust stream of a diesel engine. The catalyst is positioned such that the temperature of the exhaust fumes contacting the surface of the catalyst is high enough to sustain the reaction of the $NO_x$ in the exhaust fumes with the reductant but not so high that the heat produced by the engine and the chemical reactions that take place in the exhaust stream damages the catalyst.

Referring now to FIG. 1, a schematic diagram of a typical heavy duty diesel exhaust treatment system (2). An SCR catalyst (4) is positioned within an exhaust pipe (6). The exhaust pipe has two ends. One end (8) is connected to a source of $NO_x$ (10) and the other end (12) is vented to the atmosphere (14). A typical system may also include an option additional pair of catalysts, (16) and (18), these are positioned before (16) and after (18) the SCR catalyst (4). The oxidation catalysts catalyse the oxidation of various compounds in the exhaust stream including organic molecules and un-reacted ammonia.

Because the SCR system requires a reductant such as ammonia or urea, the SCR system includes a system for storing, and delivering the reductant to the catalyst. Still referring to FIG. 1, reductant storage vessel (20) is connected to a first delivery tube (22). First delivery tube (22) has two ends the first end the inlet (24) of tube (22) is connected to storage vessel (20) while the second end the outlet (26) of tube (22) is connected to a reductant delivery valve (28) that regulates the flow of the reductant from tube (22) to a second delivery tube (30). Tube (30) also has two ends the first end inlet (32) is connected to the outlet of valve (28) while the second end outlet (34) of second delivery tube (32) is connected to the exhaust pipe (6). The outlet (34) of second delivery tube (30) is connected to exhaust pipe (6) such that the reductant in second delivery tube (30) is delivered onto or near the surface of SCR catalyst (4) by outlet (34).

In some embodiments, the SCR system (2) may include a device (36) for maintaining the temperature of the reductant in storage vessel (20). In some configurations, the first reductant delivery tube (22), the reductant delivery value (28) and/or the second reductant delivery tube (30) may also be equipped with a device (40) to help regulate the temperature of the reductant in the system. In some embodiments of the invention, the device for regulating the temperature of the reductant (40) may be selected from the group consisting of: insulation, a heating coil or sock; and/or a cooling or warming jacket or some combination thereof.

In some embodiments, the system (2) may further include an optional mixing device (43) supplied to either periodically or continuously agitate the contents of reductant storage vessel (20). Vessel (20) may also be equipped with a temperature sensor (44) to measure the temperature of the contents of vessel (20). Vessel (20) may also be equipped with a probe (46) for measuring the nitrogen content of the material stored in vessel (20). In some embodiments, the system may be supplied with a controller (42) which may include inputs from sensors connected to the exhaust and/or SCR systems. The controller may also be equipped with a Central Processing Unit or dedicated logic circuits that regulate the dispersion of reductant to the system as necessary to maintain the release of $NO_x$ within acceptable limits. The controller may also be used to monitor the temperature or the reductant delivery system and perhaps to control portions of the system dedicated to maintain the reductant within an acceptable temperature range. In some embodiments, the same controller is used to regulate the rate and/or frequency of the agitator associated with reductant storage tank one. In some embodiments, the controller may be used to monitor the level of reductant and/or the composition of the reductant in reductant storage vessel (20). Some exhaust systems include an oxidation catalyst (18), generally located downstream of the SCR catalyst. Some oxidative catalysts can oxidize ammonia and formaldehyde, thereby preventing the release of these compounds into the atmosphere.

Sensors that can be used to monitor the level of compounds that include ammonia and urea in DEF formulation include, but are not limited, to those disclosed in U.S. Pat. No. 7,722, 813 issued on May 25, 2010, which is incorporated herein by reference in its entirety. Some of these sensors operate by measuring the ability of a formulation of DEF to transfer heat and correlating this property with the concentration of urea in the system. In some versions the sensor in the form of a probe is inserted into the DEF formulation. In some embodiments, the system includes a circuit used to supply a current applied to a heating element positioned in a portion of the probe that is submerged in the DEF in order to produce heat and a temperature sensing device that is also submerged in the DEF. The amount of current that must be applied to the heating element in order to produce a discernable effect on the temperature sensor is influenced by the composition of the liquid surrounding the probe tip. The relationship between the levels of current that must be applied to affect a temperature change measured at the probe's temperature sensor can be determined as a function of urea content in the DEF. Once the relationship between current and urea content is known for a given probe and a formulation with certain components the relationship can then be used to infer the level of urea in a sample of DEF by measuring the amount of current required to effect a change in temperature. Any method that can be used to determine or at least estimate the composition of DEF in a storage tank or anywhere in a SCR system can be used to practice the invention.

Spec grade DEF is widely available for use in SCR based $NO_x$ reduction systems. Spec grade DEF includes on the order of about 32.5 wt. % urea and purified water. These formulations are optimized to prolong catalyst life and include extremely low levels of impurities that can cause deposits or poison expensive SCR catalysts. Accordingly, SCR spec grade DEF and the formulations disclosed herein have virtually undetectable levels of sulphur, metals, non-combustible fillers, other inert contaminants, compounds whose effects on SCR catalyst life are unknown.

This technology is well known and has widespread use in Europe, and its use has been growing in North America. Still some challenges persist in the use of this technology including the tendency for urea deposits to form in the exhaust system especially between the DEF dosing inlet and upstream of selective catalytic reduction (SCR) catalyst and the relatively high freezing point of 32.5 wt. % urea in water solutions. This latter problem has been addressed by certain formulation nitrogen-based reductants which have lower freezing points than aqueous urea and still function. Some of these formulations are disclosed in U.S. patent application Ser. No. 13/193,793 filed on Jul. 29, 2010, the disclosure of which is incorporated herein by reference in its entirety.

The problem of urea deposition in the DEF feeding system can cause reduced fuel efficiency, particulate filter failure, damage to the SCR catalyst bed, and even engine failure as a significant build-up of urea in the exhaust system may cause excessive back pressure. Some exhaust systems are equipped with pressure sensors, in part to detect the effects of urea deposition. These sensors are part of a monitoring system that enables the diesel operator to detect problematic urea build-up and to take appropriate action such as shutting down the system until the deposits can be physically removed from the system. Still other systematic approaches to addressing the problem of urea build-up is to alter the position the DEF feed tube and/or time the release of DEF into portion of the exhaust system immediately up-stream of the SCR catalytic bed in order to minimize the time that urea rich DEF is in contact with the DEF feed system and pre-SCR section of the exhaust system.

Some aspects of the instant invention address the problem of urea deposition by introducing small amount of formaldehyde into DEF. These formulations exhibit an unexpectedly lower tendency to form urea deposits without an apparent effect of SCR catalytic efficiency. As disclosed herein, the addition of small amount of formaldehyde on the order of 0.03 wt. % to spec grade DEF can reduce the urea deposition. Embodiments of the invention include spec. grade DEF mixed with at least 0.08 wt. % formaldehyde, for use in the catalytic reduction of $NO_x$ in diesel engine exhaust.

Aspects of the invention include formulation of spec grade DEF that include levels of formaldehyde sufficient to significantly reduce the level of urea deposited in the diesel exhaust treatment system. Many of these formulations, much like currently commercially available spec grade DEF, is substantially fee any compound that can affect SCR performance and half-life.

Still other aspects of the invention include introducing urea and levels of formaldehyde sufficient to reduce the deposition of urea in the diesel exhaust system by 90, 95, or even 98 or greater percent that similar DEF formulation that do not include the levels of formaldehyde disclosed herein.

Methods for adding formaldehyde directly to spec grade DEF include any method for the addition of such compounds to aqueous solutions. These methods include bubbling or sparing gaseous formaldehyde into aqueous preparations of spec grade DEF in the level of formaldehyde in the DEF reach the desired levels. Such mixing can be done when DEF is manufactured or it may be down sometime later, for example, when DEF is added to DEF container in the commercial outlet or in the tank or other container that hold spec grade DEF.

Still another method for adding formaldehyde to DEF is to mix liquid preparations of formaldehyde directly with spec grade DEF. In some embodiments, the formaldehyde mixed with the spec grade DEF is itself in the mixture of compounds. One such preparation of formaldehyde that can be mixed with DEF is formalin, a mixture of formaldehyde, methanol, and water.

Still another method for using formaldehyde to reduce urea build-up in diesel exhaust systems is to introduce formaldehyde into the mixer along with spec grade DEF. Some of these methods may make use formaldehyde's low vapour pressure (formaldehyde is a gas at room temp with high vapour pressure up to 5 bar). In some embodiments, a high pressure cartridge that includes formaldehyde is used to deliver the requisite level of formaldehyde into a DEF storage tank located at the commercial outlet where spec grade DEF is solid or into a DEF reservoir position on the equipment. One advantage of this approach is that it eliminates or at least reduces the customer's exposure to formaldehyde.

EXAMPLES

Referring now to Table 1. Various formulation of DEF were created and tested to determine if the different formulations had a measurable effect on the tendency of urea to deposit in a disease exhaust treatment system. The engine run parameters used to generate the data summarized in Table 1, are presented in Table 2.

Referring again to Table 1. As a control and to determine a base line for urea deposition in the system used to test various formulation of DEF, commercially available DEF was tested. The DEF tested, included 32.5 wt. % urea; a sample of this material was analyzed and was found to include 0.0005 wt. % aldehyde.

The required quantities of spec DEF (commercially available) and formalin (mixture of water, formaldehyde and methanol) were added and mixed well in a sealed container with a help of magnetic stirrer. The sealed container was placed in 31° C. water bath prior to being tested.

Figure 2:
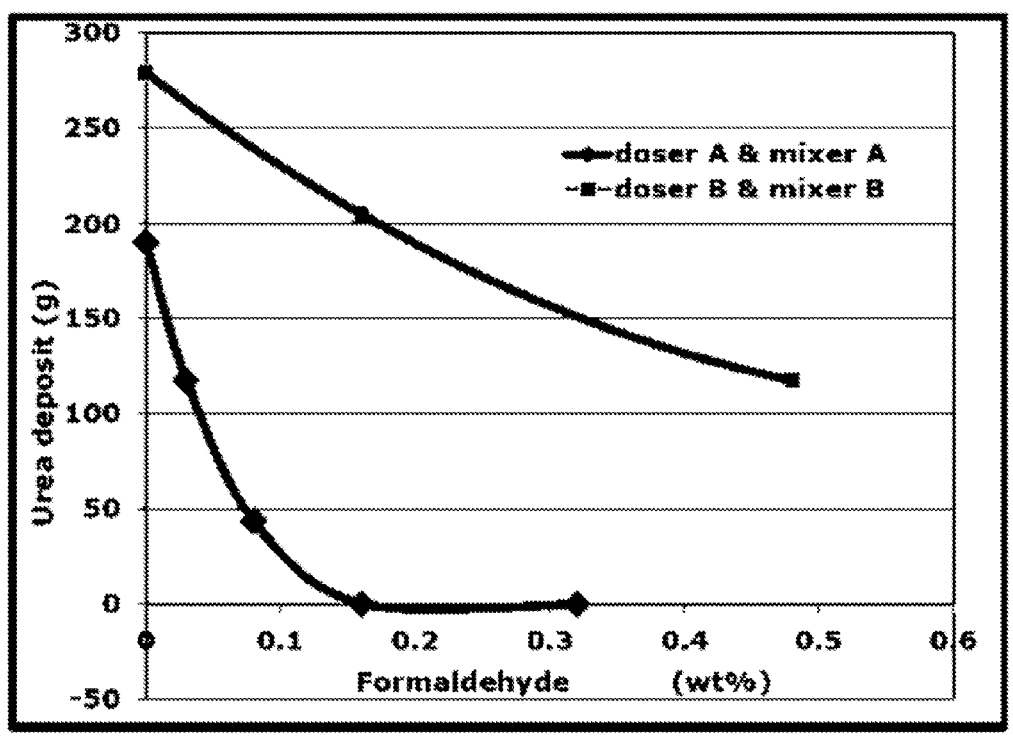
FIG. 2. A graph of grams (g) of urea deposited in diesel exhaust system as function of the wt. % of formaldehyde added to spec DEF.
Figure 3:
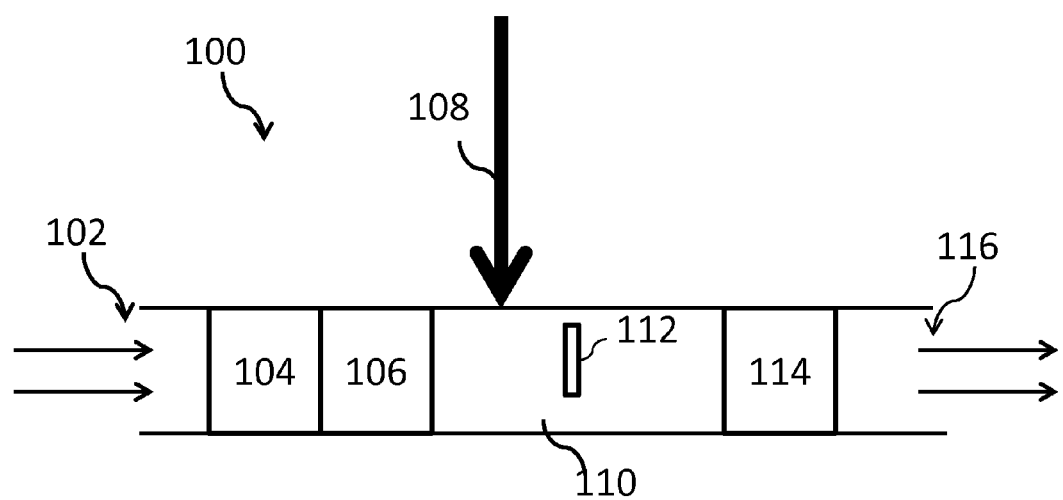
FIG. 3. A schematic showing portions of an exemplary diesel exhaust treatment system.

Referring next to FIG. 3, a schematic of an exemplary diesel exhaust system (100) is illustrated. Diesel exhaust system (100) illustratively includes exhaust inlet (102), DOC (104), DPF (106), doser (108), decomposition tube (110), mixer (112), SCR/SCR-AOC (114), and exhaust outlet (116). SCR/SCR-AOC (114) may be an SCR or a combination of an SCR and an oxidation catalyst. The amount of urea that may be deposited in the exhaust treatment system is a function of factors including engine operating parameters, ambient condition, the positioning and/or configuration of the doser (108), and/or mixer (112) with the decomposition tube (110). Referring now to FIG. 2, the effect of doser and mixer on the rate of urea deposition is illustrated by the differences in the amount of urea deposited as shown by the 2 different curves in the figure. In both arrangement the addition of small amounts of formaldehyde to the DEF reduced the rate at which urea was deposited in the diesel exhaust treatment system.

The decomposition tube in aftertreatment system, where one would expect urea to be deposited, was removed and recorded for clean weight at 250° C. The decomposition tube was then installed back into the system before the urea deposit study was started. Prior to injecting the modified DEF into the decomposition tube, circulating coolant was used to maintain the temperature of the dosing module at about 80° C. The test was carried out with a help of flow bench set-up which mimics exact engine conditions. Desired steady state space velocity and stable temperatures were achieved with help of air flow and natural gas combustion respectively. Under specific flow bench and steady state conditions, the required quantities of modified DEF injected into decomposition tube for 4 hrs (See Table 2). Once the test was completed, the decomposition tube was removed and weighed at 250C. The amount of urea deposited in the tube was calculated based on initial and final weight of decomposition tube. The amount of urea in the various formulations and the amount of urea deposited in the decomposition tube is summarized in Table 1.

Other formulations that were made and tested for their effect on urea deposition included: 0.11 wt. % methanol, added to specification grade DEF (spec DEF); 0.32 wt. % formic acid added to spec DEF; 0.32 wt. %, 0.16 wt. %, 0.08 wt. %, or 0.03 wt. % formalin added to spec DEF. The addition of defined amounts of formalin to DEF resulted in a change in the amount of formaldehyde measured in the various mixtures.

TABLE 1

Mixtures of DEF and various additives, level of formaldehyde measured in the various mixtures, the amount of urea (g) deposited in a test diesel exhaust treatment system.

| Solution mixture of Spec DEF and Additive | Added wt % | Resulting formaldehyde (wt %) | urea deposit (g) | urea deposit reduction by (%) |
|---|---|---|---|---|
| DEF** | — | 0.0005 @ | 190 | 0.0 |
| Methanol in spec DEF | 0.11 | NA | 185.6 | 2.3 |
| Formic acid in spec DEF | 0.32 | NA | 200.1 | -5.3 |
| Formaldehyde in spec DEF | 0.32 | 0.0050 @ | 0.9 | 99.5 |
| Formaldehyde in spec DEF | 0.16 | 0.0023 @ | 1.5 | 99.2 |
| Formaldehyde in spec DEF | 0.08 | 0.0010 * | 43.6 | 77.1 |
| Formaldehyde in spec DEF | 0.03 | 0.0005 * | 117.5 | 38.2 |

**All mixtures in Table 1 include specification-grade DEF, which comprises about 32.5% urea.
@ determined by chemical analysis
* Expected values
Note:
formaldehyde was added to spec DEF by measured amounts of Formalin, a mixture of formaldehyde (35-39%), methanol(10-15%) and water. Results reported in the table are those obtained using doser A & mixer A.

TABLE 2

Engine Test Conditions used to collect the data summarized in Table 1.

| Test Condition | Steady State |
|---|---|
| Exhaust flow (kg/hr) | 350 |
| Exhaust flow temp (C.) | 350 |
| DEF flow (g/sec) | 0.38 |
| Test duration (hr) | 4 |

Referring now to FIG. 2. Some of the data in Table 1 is presented graphically (see lower line in the figure). The upper curve shows the percent of urea accumulation as a function of formaldehyde in the DEF used in the test (doser A and mixer A). The curve generated with doser B and mixer B (the upper curve) illustrates 1) the effect of doser and mixer choice and position on the rate of urea deposition and 2) that less urea accumulates in the exhaust system with either doser and mixer combination when formaldehyde is added to the DEF.

While the novel technology has been illustrated and described in detail in the figures and foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

We claim:

1. A formulation for reducing oxides of nitrogen in diesel engine exhaust, comprising:
   about 19.0 wt. % to about 40 wt. % urea;
   at least 0.0010 wt. % formaldehyde; and
   demineralized water.

2. The formulation according to claim 1, including:
   no more than 0.6 ppm of phosphates, calcium, iron, aluminum, magnesium, sodium and potassium; and
   no more than 0.3 ppm copper, zinc, chromium, and nickel.

3. The formulation according to claim 2, comprising:
   between about 0.001 wt. % and about 0.01 wt. % formaldehyde.

4. The formulation according to claim 2, further including:
   between about 15.0 wt. % to about 40.0 wt. % ammonium carbamate.

5. The formulation according to claim 4, comprising:
   between about 19.0 wt. % to about 35.0 wt. % urea;
   between about 15.0 wt. % to about 40.0 wt. % ammonium carbamate;
   at least 0.0010 wt. % formaldehyde;
   between about 40.0 wt. % to about 60.0 wt. % demineralized water;
   no more than 0.6 ppm of phosphates, calcium, iron, aluminum, magnesium, sodium and potassium; and
   no more than 0.3 ppm copper, zinc, chromium, and nickel.

6. The formulation according to claim 5, wherein said formulation comprises:
   between about 19.0 wt. % to about 35.0 wt. % urea;
   between about 20.0 wt. % to about 35.0 wt. % ammonium carbamate;
   between about 0.0020 wt. % to about 0.01 wt. % formaldehyde;
   between about 45.0 wt. % to about wt. 55.0% demineralized water.

7. The formulation according to claim 5, wherein said formulation comprises:
   between about 19.0 wt. % to about 22.0 wt. % urea;
   between about 30.0 wt. % to about 35.0 wt. % ammonium carbamate;
   between about 0.0050 wt. % to about 0.01 wt. % formaldehyde; and
   between about 45.0 wt. % to about 50.0 wt. % demineralized water.

8. A method for reducing an oxide of nitrogen in diesel exhaust, comprising the steps of: providing a Diesel Exhaust Fluid formulation, wherein the formulation includes:
   urea;
   ammonium carbamate;
   formaldehyde;
   demineralized water;
   no more than about 0.6 ppm of phosphates, calcium, iron, aluminum, magnesium, sodium, and potassium; and
   no more than 0.3 ppm copper, zinc, chromium and nickel, wherein said formulation is suitable for use in the Selective Catalytic Reduction of NOx in diesel engine exhaust gases; and
   introducing the formulation into diesel exhaust such that the formulation reacts with NOx on the surface of a SCR.

9. The method according to claim 8, wherein said formulation, comprises:
   between about 15.0 wt. % to about 40.0 wt. % urea;
   between about 15.0 wt. % to about 40.0 wt. % ammonium carbamate;
   between about 40.0 wt. % to about 60.0 wt. % demineralized water; and
   between about 0.001 wt. % to about 0.010 wt. % formaldehyde.

10. The method according to claim 8, wherein said formulation, comprises:
    between about 19.0 wt. % to about 35.0 wt. % urea;
    between about 15.0 wt. % to about 40.0 wt. % ammonium carbamate; and
    between about 40.0 wt. % to about 60.0 wt. % demineralized water.

11. The method according to claim 8, wherein said formulation, comprises:
  between about 19.0 wt. % to about 22.0 wt. % urea;
  between about 30.0 wt. % to about 35.0 wt. % ammonium carbamate; and
  between about 45.0 wt. % to about 50.0 wt. % demineralized water.

12. The method according to claim 8, further including the step of:
  determining the composition of said formulation.

13. The method according to claim 12, wherein the determining step includes measuring the amount of urea in said formulation.

14. The method according to claim 13, wherein the determining step includes using a sensor and wherein the sensor is in contact with said formulation.

15. The method according to claim 8, further including the step of:
  adjusting the composition of said formulation by the addition of at least one chemical to said formulation, wherein the at least one chemical is selected from the group consisting of: urea, ammonium carbamate, formaldehyde, and demineralized water.

16. A system for reducing the level of NOx released into the atmosphere by the combustion of diesel fuel; comprising
  a formulation, wherein said formulation includes:
    urea;
    ammonium carbamate;
    formaldehyde; and
    demineralized water; wherein said formulation is suitable for the Selective Catalytic Reduction of NOx in diesel exhaust gases; and
  a reservoir for holding at one component of said formulation.

17. The system according to claim 16, wherein the formulation, comprises:
  between about 15.0 wt. % to about 40.0 wt. % urea;
  between about 15.0 wt. % to about 40.0 wt. % ammonium carbamate;
  between about 0.0010 wt. % to about 0.010 wt. % formaldehyde; and
  between about 40.0 wt. % to about 60.0 wt. % demineralized water.

18. The system according to claim 16, wherein said formulation comprises:
  between about 19.0 wt. % to about 35.0 wt. % urea;
  between about 20.0 wt. % to about 35.0 wt. % ammonium carbamate;
  between about 0.0020 wt. % to about 0.01 wt. % formaldehyde; and
  between about 45.0 wt. % to about wt. 55.0% demineralized water.

19. The system according to claim 16, wherein said formulation comprises:
  between about 19.0 wt. % to about 22.0 wt. % urea;
  between about 30.0 wt. % to about 35.0 wt. % ammonium carbamate;
  between about 0.0020 wt. % to about 0.05 wt. % formaldehyde; and
  between about 45.0 wt. % to about 50.0 wt. % demineralized water.

20. The system according to claim 17, further including:
  a device for measuring the composition of said formulation.

* * * * *